United States Patent [19]

Sylla et al.

[11] 4,309,087
[45] Jan. 5, 1982

[54] SLIDE MAGAZINE PROJECTOR

[75] Inventors: Jürgen Sylla; Gerrit Pahl, both of Munich, Fed. Rep. of Germany

[73] Assignee: AGFA-Gevaert Aktiengesellschaft, Fed. Rep. of Germany

[21] Appl. No.: 151,107

[22] Filed: May 19, 1980

[30] Foreign Application Priority Data

May 22, 1979 [DE] Fed. Rep. of Germany ....... 2920777

[51] Int. Cl.$^3$ ............................................. G03B 23/04
[52] U.S. Cl. ...................................... 353/92; 353/116
[58] Field of Search ................ 353/113, 114, 116, 92, 353/93, 88, 103

[56] References Cited

U.S. PATENT DOCUMENTS 2,982,177 5/1961 Briskin et al. .................. 353/116 X
3,711,195 1/1973 Gehlert et al. ...................... 353/116

FOREIGN PATENT DOCUMENTS

2738237 1/1979 Fed. Rep. of Germany ...... 353/116

Primary Examiner—Harry N. Haroian
Attorney, Agent, or Firm—Michael J. Striker

[57] ABSTRACT

A slide projector having a slidably movable magazine with slides, a platform to receive a slide from the magazine, a first support member to transport a slide from the magazine into the platform and a second support to return the used slide from the platform into the magazine. The first support is rigidly mounted on a slidably movable carriage and adapted to push each successive slide from the magazine when the latter is in alignment with the platform. The second support is pivotally mounted on the slide carriage which moves in the direction toward or backward from the magazine. The second support is a three-linked member adapted to engage the used slide to push the latter back to the magazine and having a pin between a first lever and a second lever. A cammed surface is provided in the housing which engages the pin upon slidable movement of the carriage. The cammed surface has a downwardly projecting inclined portion to restrict the movement of the second support toward the magazine after the used slide has been returned into the magazine.

8 Claims, 5 Drawing Figures

SLIDE MAGAZINE PROJECTOR

BACKGROUND OF THE INVENTION

The invention relates to slide magazine projectors wherein a magazine with slides is movable within a housing of the projector, from which magazine each successive slide to be shown is transported to a platform positioned behind an objective and returned back to the magazine after this slide has been used.

The known projectors of the foregoing type generally include a slide carriage to be moved in a direction normal to that of the magazine movement. Transporting means to place a slide on a platform wherein the slide is usually disposed when projected, are provided in the projector. A partition which is generally disposed in the path of projection light and a supporting element for returning the slide into the magazine are usually rigidly connected to the slide carriage and it is therefore relatively difficult to control their position with respect to a slide disposed on the platform.

SUMMARY OF THE INVENTION

It is an object of the invention to provide an improved construction of the slide projector.

Another object of the invention is to provide a construction which is reliable in operation and easy to control in use.

These and other objects of the invention are attained by a slidable-magazine projector of the type having an objective, lenses and a projecting lamp, which comprises a housing having a plurality of walls and a compartment to receive a magazine with slides adapted for slidable movement in the housing. A platform for receiving slides from the magazine is positioned between the objective and the lenses. Drive means for stepwise shifting the magazine within the housing and means for arresting the magazine when the latter is in alignment with the platform, are provided in the projector. The projector further comprises a carriage adapted for slidable movement within the housing in the direction normal to that of the movement of the magazine and a partition arranged in the housing for moving into and from a position in a path of projection light. Means for placing a slide onto the platform are arranged in the projector and include a first support rigidly mounted on the carriage. Means for returning the slide to the magazine include a second movable support having a first lever pivotally mounted on the carriage, a second lever rigidly connected to the first lever and having a pin at a connection between the first lever and the second lever, and a third lever terminated with a pusher to engage a slide. The housing is provided with a cammed surface which is formed with in inclined portion projecting downwardly. When the carriage moves towards the magazine the pin is moved in engagement with the canned surface and then with the inclined portion thereof for permitting the pusher to transport a used slide to the magazine and for preventing a further movement of the pusher after the used slide has been returned into the magazine.

Means for pivotal movement of the partition into and out of the path of light may be provided in the projector. Means for controlling this pivotal movement may be arranged in the projector.

The second lever and the third lever of the second movable support may be angularly positioned with respect to each other.

All three levers of the movable support may be disposed in different planes.

The aforementioned cammed surface may be defined by two spaced edges of two parallel walls of the housing.

The means for pivotal mounting of the partition may include an axle mounted on one of the walls of the housing, a bearing bushing pivotally mounted on the axle and connected to the partition, a control member mounted on the partition, and a cammed groove formed in the carriage and arranged for engagement with the control member to thereby arrest the partition after the partition has been pivoted into the position in the path of projecting light.

The means for shifting the magazine may include a thrust member pivotally mounted on the carriage, a first projection mounted at one end of the thrust member and a second projection mounted at another end of the thrust member, and a drive gear associated with the magazine, the thrust member is adapted to interact with the drive gear when the magazine is in alignment with the platform, and the first and the second projections overlapping the ends of the thrust member to prevent the thrust member from falling out of the carriage during the pivoting movement thereof.

The shifting means may further include a pinned gear connected to the drive gear and having spaced pins, the thrust member adapted to be engaged between two successive pins to cause a rotation of the drive gear for shifting the magazine within the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE INVENTION

Figure 1:
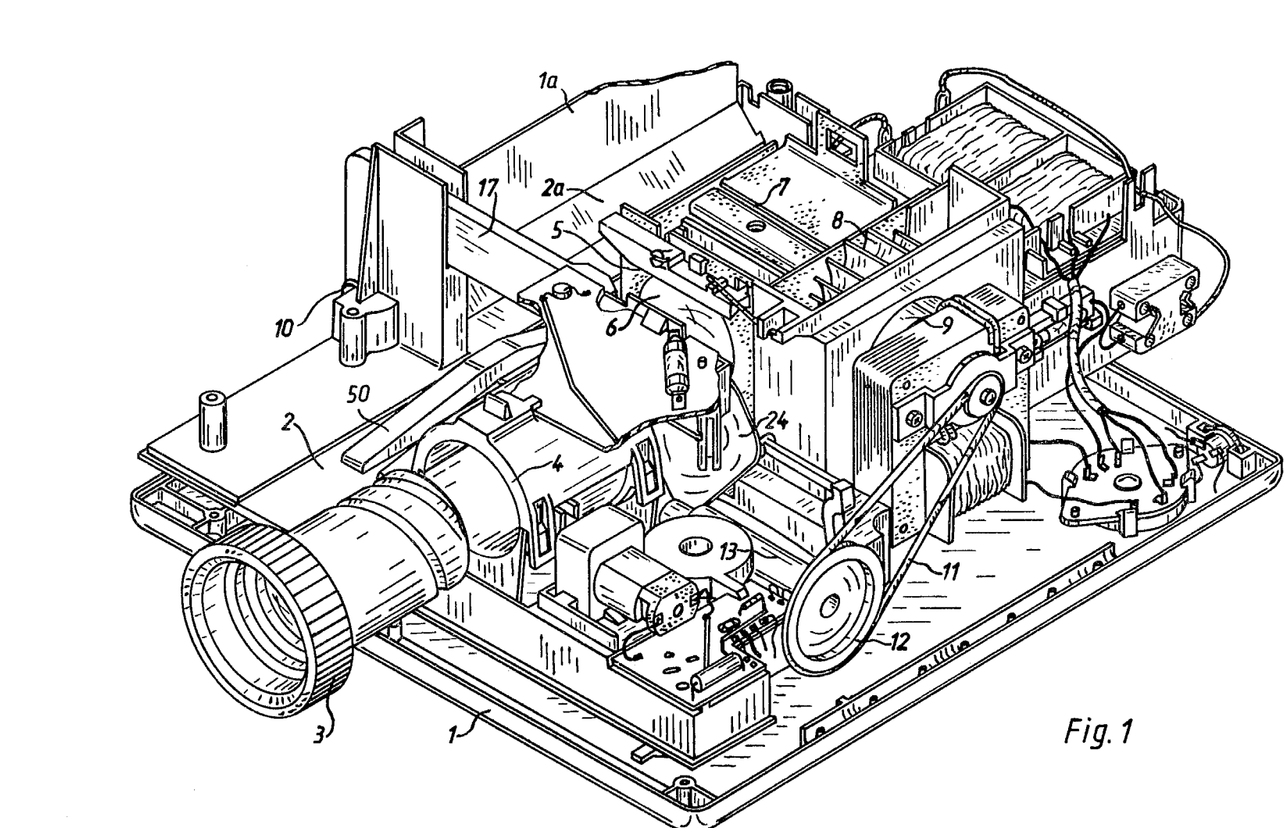
FIG. 1 is a perspective view of a slide projector according to the invention.

Referring to the drawings, FIG. 1 shows a slide projector including a housing 1a with a base plate 1 on which an intermediate plate 2 and vertical walls are positioned. A magazine compartment 2a to accommodate a magazine with slides extends along a side wall of the housing 1a. The magazine (not shown) is slidably movable along the compartment 2a by means of rails 50. A slide platform 5 is disposed between an objective 3 and condensor lenses 6. A fan 8 and a lamp 7 are positioned in a rear part of the housing. A drive motor 9 coupled with the fan 8 and carrying a belt 11 on a shaft thereof serves as a drive for a slide carriage generally denoted by 10. The belt 11 is supported on a pulley 12 which is mounted on a worm shaft 13.

When the projector is switched on the motor 9 and the fan 8 become operative; the projector lamp 7 lights up at the same time. The carriage 10 is coupled with the shaft 13 by means described hereafter so that an automatic movement of the slide carriage 10 after one successive slide has been discharged onto the platform 5 is provided. It should be noted that a hand operation to insert a slide into the platform and to take a used slide out of the platform may be obtained by a suitable handle not shown in the drawings.

Figure 2:
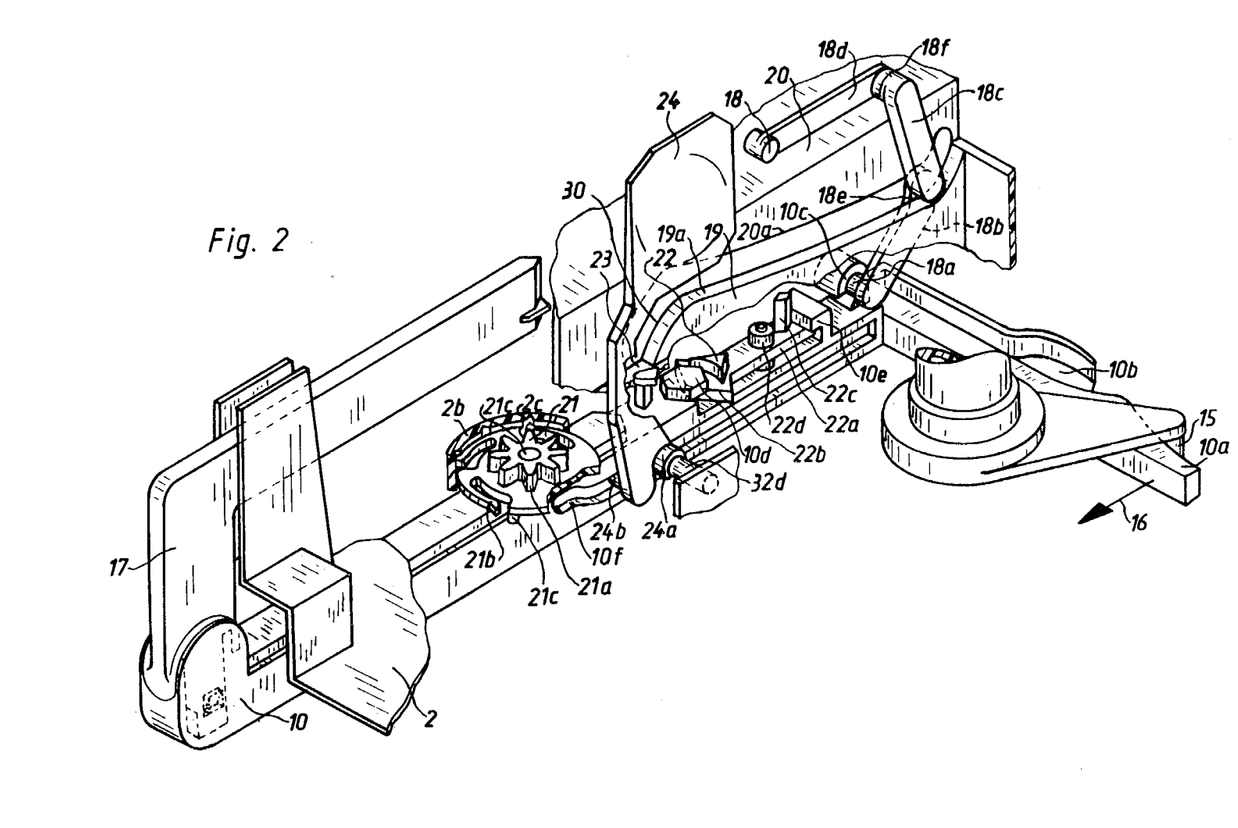
FIG. 2 is an enlarged perspective view of a slide carriage arrangement of the slide projector.
Figure 4:
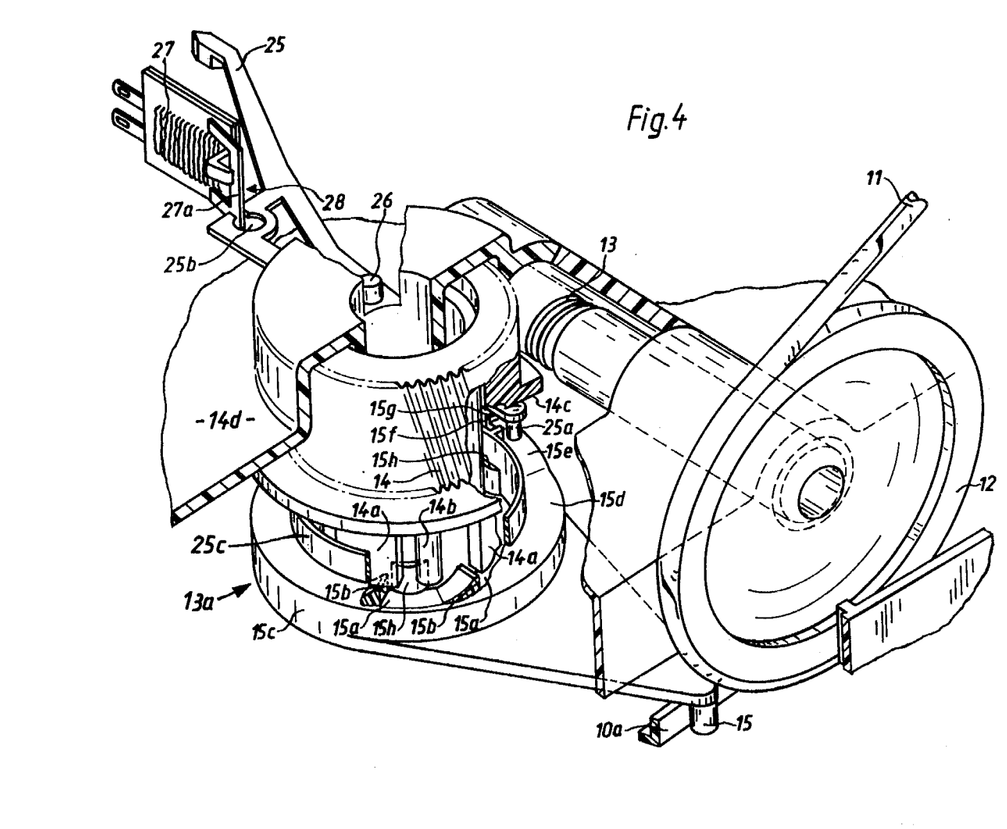
FIG. 4 is a perspective view of a coupling mounted between a drive motor and the slide carriage arrangement shown in FIG. 2.
Figure 5:
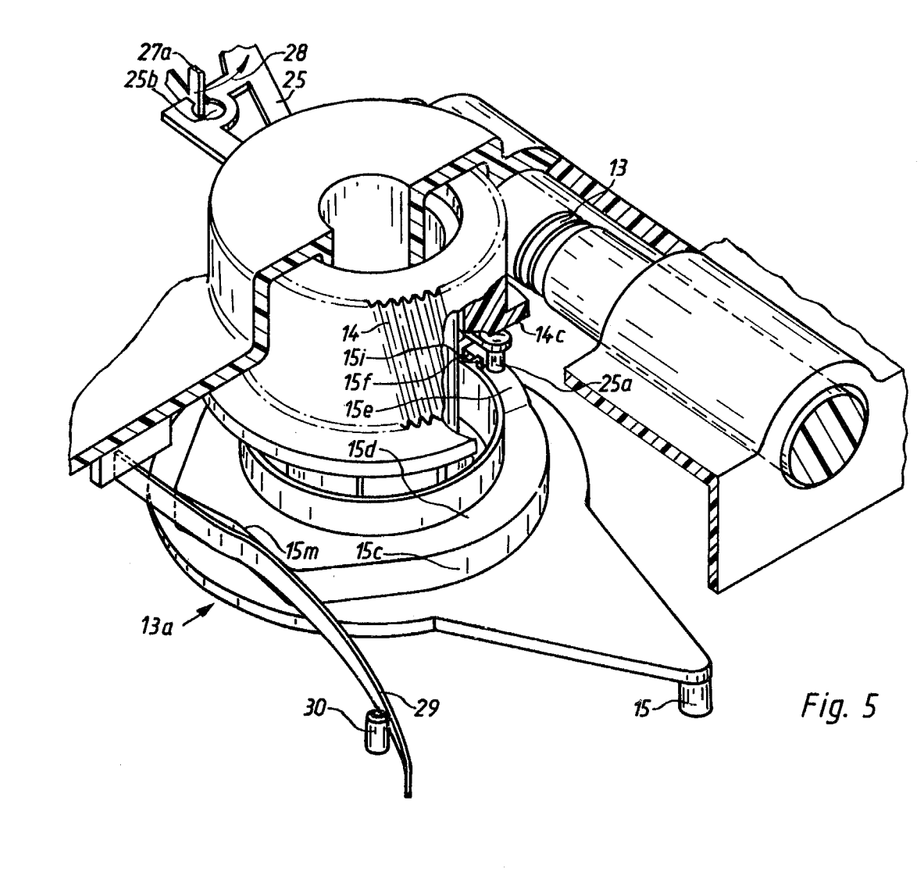
FIG. 5 is a perspective view of another embodiment of the coupling shown in FIG. 4.

As shown in FIGS. 4 and 5, a worm shaft 13 is engaged with a worm gear 14 which is mounted on the same shaft with a coupling 13a having a flange 15c. Flange 15c is formed with an outwardly extending portion terminated with a pin 15 arranged to turn 360° about an axis of the coupling 13a. The pin 15 is adapted to interact with an angular arm 10a which is extended in a direction normal to the direction of elongation of the slide carriage 10 shown in FIG. 2. An angular curve-shaped arm 10a forms with a curve-shaped arm 10b a forklike element an internal surface of which serves as a cammed surface for the pin 15. Arms 10a and 10b are formed as integral parts of the carriage 10. Due to rotation of the coupling 13a which will be discussed in detail below, the pin 15 turns in a clockwise direction, as shown in FIG. 2 and urges the arm 10a to move in the direction shown by an arrow 16, whereby a slide located in the slide platform 5 will be transported into the magazine in a manner which will be described below. During further rotation of the pin 15 about the axis of the coupling 13a the pin 15 engages an internal surface of the arm 10b and urges the slide carriage 10 in the direction opposite to that shown by the arrow 16; at the same time a new successive slide is displaced from the magazine onto the slide platform 5. The coupling 13a, operatively connected with the worm gear 14, is so adjusted that before uncoupling of the pin 15 with the gear 14, the pin 15 is disengaged with arm 10b and moves out of the same. In a rest position of the elements 15, 10a and 10b the latter are disengaged so that the carriage 10 can freely move back and forth so that one can reinsert the slides into the slide platform 5 by hand when it is desired. During the next operational step when a new successive slide is shifted to a position to be transported onto the slide platform 5, the pin 15 is again in its respective position in engagement with the arm 10a.

The slide carriage 10 is fabricated from the same material as the housing parts and is so formed as to communicate with the remaining parts of the projection in snap-or-push-on connection relationship. As was mentioned before, a fork-like element composed of the arms 10a and 10b is made integrally with the slide carriage 10. A support element 17 for transporting a slide from the magazine to the slide platform 5 is formed as an angularly-shaped piece connected with the carriage 10 in push-on-snap-connection relationship as shown by dotted lines in FIG. 2. The support element 17 may also be formed on the carriage 10.

A support member 18 adapted to transport the used slide back to the magazine is a three-linked one-piece metal element having levers 18b, 18c and 18d. The lever 18b is provided with a pivot 18a which is pivotally connected to a bushing 10c mounted on the slide carriage 10. Three levers 18b, 18c and 18d are positioned in different planes of which levers 18b and 18c are connected to each other by a pin 18e. The housing 1a in the area of the support member 18 is formed with two parallel walls 19 and 20 which form a cammed curved profile limited by two lateral curved edges 19a and 20a at a boundary between the walls 19 and 20. Two lateral edges 19a and 20a are parallel to each other and are spaced from each other so that the pin 18e is in engagement with the curved edges 19a and 20a whereas the lever 18c is arranged in the plane of the housing wall 19. The lever 18d carrying a pusher 18k is positioned above the wall 20 or in a suitable recess specially provided for this purpose.

During the movement of the slide carriage 10 in the direction of arrow 16 the pivotal connection 10c, 18a will be moved in the same direction, whereas the pin 18c slides along the curved edges 19a, 20a. The parallel edges 19a and 20a are so formed as to provide the movement of the pusher 18k in the direction of arrow 16 during the movement of the slide carriage 10. At this time the pusher 18k engages the lateral end of the used slide positioned on the slide platform 5 and pushes the slide toward the magazine. The magazine with the slide received from the slide platform is shifted further toward the front side of the housing in a manner described hereafter, however the pusher 18k does not move further in the direction toward the magazine. This action is attained by provision of inclined portions 30 of the edges 19a, 20a which extend in the downward direction. After the used slide has been moved from the platform into the magazine, the pin 18e moves downward engaging the portions 30 of curved edges 19a, 20a and thereby causing the lever 18d together with pusher 18k to rotate in a clockwise direction backward from the platform 5 so that a further motion of the pusher 18k towards the magazine is prevented. During the further movement of the carriage 10 in the direction opposite to that shown, by arrow 16, the support element 17 engages the successive slide from the magazine and transports it into the platform 5 whereas the support member 18 moves backwards to its initial position. The support member 18 may be formed as a one-piece item which is merely inserted into the housing of the projector and is mounted thereon by means of the pivot 18a connected to the bushing 10c and pin 18e limited by edges 19a and 20 of walls 19, 20 respectively.

Figure 3:
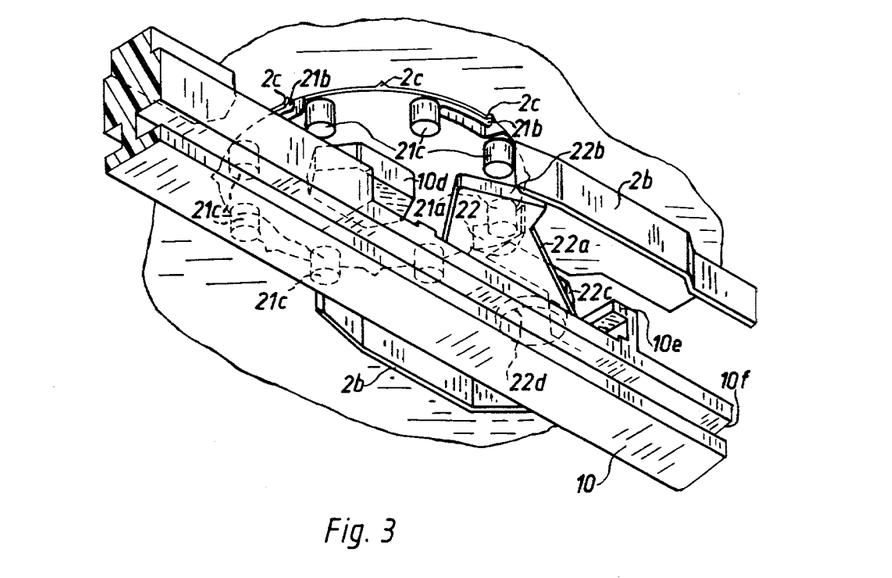
FIG. 3 is an enlarged turned perspective view of a magazine advancing arrangement with respect to the slide carriage shown in FIG. 2.

A mechanism for shifting a magazine along the compartment 2a is provided in the projector which includes a gear system with a gear 21 and a drive gearing 21a having a number of spring arms 21b at a periphery thereof and a plurality of downwardly extending pins 21c shown in FIGS. 2 and 3. The gear 21 is provided with an axial hole 21c to receive an axial shaft (not shown) mounted on the intermediate plate 2 and extended towards an upper edge of the carriage 10. The gear 21 is surrounded with a vertical wall 26 which is formed with a number of grooves 2c regularly spaced from each other which are engaged by the spring arms 21b in the certain positions to thereby arrest the gear 21 in a position in which the magazine with slides is aligned to the platform 5. During the continuous displacement of the gear 21 in its rotary motion at certain angles corresponding to the distance between two pins 21c the magazine may be further displace, depending on the direction of rotation of the gear 21. A nose-shaped thrust lever 22a is pivotally mounted on an axle 22d which is mounted on the slide carriage 10. The thrust lever 22a is provided with a nose 22 at an end thereof the movement of which in the direction of arrows 16 is controlled by a control element 23. The nose 22 is formed as a one-piece item with the lever 22a and when the slide carriage 10 is moved toward the magazine the nose 22 is pivoted to the right or to the left from its middle position until it engages one of the pins 21c which it faces at this time and thereby rotates the gear 21 in the clockwise or counterclockwise direction, whereby the magazine is transported forward or backward along the compartment 2a. When a slide in the magazine is aligned with the platform 4, the slide is transported into the platform 5 from the magazine or from the platform into the magazine. The pivotable lever 22a is formed with a tip end 22b having two symmetrically disposed and outwardly laterally extending portions. A control pin 22c is provided at one end of the lever 22a and a projecting member 10d is mounted at the other end of the lever 22a. The carriage 10 is formed with an angularly-shaped portion 10e which embraces the lever 22a in its middle position. The projecting member 10d and the portion 10e are provided in the arrangement to limit the displacement of the lever 22a so as to prevent this lever from falling out during its pivoting movement.

The control element 23 is shown in FIG. 2 in such a position that during the sliding movement of the carriage 10 in the direction shown by the arrow 16 the control pin 22c fixedly mounted on the lever 22a engages the control element 23 and the lever 22a is thereby pivoted in the counterclockwise direction. By engaging one of the pins 21a of the drive gearing 21a the nose 22 effects the rotation of the gearing 21a and therefore the gear 21 in the clockwise direction. The teeth of the gear 21 which engage the teeth provided on the magazine cause the magazine to be transported in the forward direction. The control element 23 may be rotated by hand or by a switch of a conventional electromagnetically operated device or any other conventional means. When the control element 23 is turned in the clockwise direction, the lever 22a, during the movement of the carriage 10 in the direction of arrow 16, is pivoted about the pin 22c in the counterclockwise direction and the magazine is caused to move backward along the compartment 2a by means of the gearing 21a and gear 21 operating in the above described manner.

The projecting member 10d may have the shape of a rhombus or a hexagon and should be so dimensioned that it can pass through a space between two successive pins 21a. In the position of the slide carriage 10 in which neither support element 17 nor the member 18 are in engagement with a slide and the magazine is in a position to be moved, the edge of the projecting member 10d is disposed between two successive pins 21c and thereby blocks the gear 21 against inadvertent rotation. In case the magazine should be removed from the projector in such a position, the slide carriage 10 could be displaced to the left by turning the pin 15 by hand. By moving the magazine with respect to the gear 21 which will be turned, two successive pins 21c will be pressed against two opposite sloped sides of the projecting member 10d and displaced with respect to the latter. The turning movement of the gear 21 will not be precluded any more and the magazine will be released. During the next step of operation the slide carriage 10 is moved in the direction opposite to that shown by the arrow 16 and the projecting member passes between two successive pins and moves in the same direction so that the magazine occupies a position in alignment with the platform 5. The function of the projecting member 10d is merely in providing a form-locking supporting of the pivotable lever 22a with the noze 22 and the magazine shifting device with the gearing 21a and the gear 21 during the transportation of the magazine in the projector housing. A partition 24 shown in FIGS. 1 and 2 is provided in the projector which is pivotable in dependence on a position of the slide carriage 10 into or out of the path of flashing light. The partition 24 is formed integrally with a bearing bushing 24a and a control member 24b shown in FIG. 2 which are arranged to support the partition in the projector. The bearing bushing 24a is pivotally mounted on an outwardly projecting axle 32d connected to a projector wall partially shown in FIG. 2.

For controlling the position of the partition 24 in dependence on the slidable movement of the carriage 10, a cammed groove 10f is formed on the carriage 10 which is adapted to be in engagement with the aforementioned control member 24 formed as a control pin on a back side of the partition 24. The cammed groove 10f and the control pin 24b also serve to ensure the position of the partition 24 against the axial displacement so that when the control pin 24b is in engagement with the groove 10f the position of the bushing 24a with respect to the axle 32d is ensured. The cammed groove 10f is so shaped that in the beginning of the movement of the carriage 10 in the direction of the arrow 16 the partition 24 is pivoted in the direction toward the path of the flashing light and in the end of the sliding of the carriage 10 in the direction opposite to the arrow 16 (it is a position when a new slide is disposed into the platform) the partition is pivoted out of the path of the light, e.g. towards its initial position.

Returning to FIGS. 4 and 5, these figures illustrate the coupling 13a which serves to connect the gear 14 operatively associated with the electromotor 9 with the pin 15 to actuate the slidable movement of the carriage 10. As was described above, the gear 14 is operatively connected to a worm 13 formed on the shaft which is associated to motor 9 by means of the belt 11. As shown in FIG. 4, the coupling 13a is formed as a claw coupling having a number of coupling teeth 14a formed at a lower portion of the gear 14 and corresponding recesses 15a with vertically projecting flanges 15b formed on an upper surface 15d of the flange 15c. When the coupling teeth 14a and the vertically projecting flanges 15b are in engagement, the coupling 13a is switched on to actuate the rotating movement of the pin 15 simultaneously with switching on of the projector. The coupling and uncoupling of the teeth 14a with the vertically projecting flanges 15b takes place in a vertical direction.

The coupling 13a is provided with horizontally projecting flanges 14c and 15c. The surface 15d of the flange 15c is shorter than an upper surface 14d of the flange 14c and is provided with a sloped cammed portion 15e. The coupling 13a includes a vertical wall 25c formed with a recess 15f and a vertical rim 15g which are located above the sloped cammed portion 15e of the flange 15c. Between two horizontal surfaces 15d and 14c an axle 25a is provided which is adapted to rotate about an axle 26 of a coupling lever 25.

The axle 25a is relatively high so that the coupling teeth 14a are in engagement with the vertically projecting flanges 15b when the axle 25a abuts against the horizontal surface 15d and a lower surface of the flange 14c. When the axle 25a is in intermediate contact with the surface 15d and against the rim 15g the gear 14 is lifted due to the cammed surface 15e, whereby the coupling teeth 14a are raised with respect to the flanges 15b and the gear 14 is allowed to solely rotate since the latter is disengaged with the flange 15c and thus with the pin 15. By provision of the cammed portion 15e in the coupling 13a the disengagement of the gear 14 with the pin 15 may be obtained, after each revolution of the pin 15 if desired.

When the gear 14 is disengaged with the pin 15 the slide carriage 10 is released.

The coupling 13a is provided with a vertically extended finger 14b and a cam 15h formed on the flange 15c; cam 15h is higher than the vertically projecting flange 15b. When the axle 25 is further rotated about the axle 26, the gear 14 is further raised so that the finger 14b meets the cam 15h, engages the latter and then passes the cam. Therefore the gear 14 and the pin 15 still remain in engagement for a short time so that the uncoupling of the coupling 13a is a smooth process.

The other end of the coupling lever 25 is formed with a fork 25b which is operatively connected to an armature 27a of an electro-magnet 27. When the electromagnet 27 is energized, as for example by means of a button provided on the projector, the armature 27a is pulled into the fork 25 in the direction shown by an arrow 28 to thereby cause the pivoting movement of the coupling lever 25 with the axle 26 in the clockwise direction. The axle 25a is guided from the rim 15g and is then engaged by the recess 15f so that the axle 25a lies between two horizontal surfaces 15d and 14c. In this case the coupling teeth 14a are again engaged by recesses 15a and the vertically projecting flanges 15b of the coupling 13a are again turned through 360° to thereby provide the slidable movement of the carriage 10 by the pin 15 in the manner described above.

FIG. 5 shows another embodiment of the coupling 13a shown in FIG. 4.

In this embodiment an elevated rim 15 is provided which is extended from a recess 15f. The coupling axle 25a during the uncoupling of the gear 14 with the pin 15 is not inserted into the recess 15f. Instead of the finger 14b and the cam 15h, a blade spring 29 is arranged in the coupling 13a one end of which is mounted on the housing. The second end of the spring 29 is supported on an axle 30. The lateral surface of the flange 15c is formed with a cammed portion 15m with which the spring 29 interacts. The uncoupling action of the coupling 13a occurs when the cammed portion 15m engaging the spring 29 reaches a certain position upon the rotation of the gear 14 to cause the disengagement of the gear 14 with the flange 15c and therefore the pin 15.

It will be understood that each of the elements described above, or two or more together, may also find a useful application in other types of slide projector differing from the types described above.

While the invention has been illustrated and described as embodied in a slide projector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A slide magazine projector of the type having an objective lenses and a projecting lamp comprising a housing with a plurality of walls and with a compartment to receive a magazine with slides adapted for slidable movement in the housing; a platform for receiving a slide from the magazine positioned between the objective lenses and the lamp; drive means for shifting the magazine within the housing; means for arresting the magazine when the latter is in alignment with said platform; a slide carriage adapted for slidable movement within said housing in two opposite directions which are normal to that of the slidable movement of the magazine; a partition arranged in said housing for moving into and from a position in the path of projecting light; and means for placing a slide onto said platform; and means for returning the slide into the magazine, said placing means including a first support rigidly mounted on said carriage and adapted to transport slides from the magazine onto said platform, said returning means including a second movable support adapted to transport the slides from said platform into the magazine, said second support including a three-linked member having a first lever pivotally mounted on said carriage, a second lever rigidly connected to said first lever and having a pin at a connection between said first lever and said second lever and a third lever terminated with a pusher to engage a slide, said housing being provided with a cammed surface, said pin being arranged in engagement with said cammed surface, said cammed surface being formed with an inclined portion projecting in a downward direction, whereby when said carriage moves towards the magazine said pin is moved in engagement with said cammed surface and then with said inclined portion thereof for permitting said pusher to move toward the platform and to transport a used slide from said platform to the magazine and for preventing a further movement of said pusher towards the magazine after the used slide has been returned into the magazine.

2. The projector of claim 1, further including means for pivotally moving said partition into and from the path of flash light and means for controlling said pivotal movement.

3. The projector of claim 2, wherein said second lever and said third lever are angularly positioned with respect to each other.

4. The projector of claim 3, wherein said first, second and third levers are disposed in different planes.

5. The projector of claim 4, wherein said cammed surface is defined by two spaced edges of two parallel walls of said walls of said housing.

6. The projector of claim 5, wherein said means for pivotally mounting said partition include an axle mounted on one of said walls of said housing, a bearing bushing pivotally mounted on said axle and rigidly connected to said partition, a control member mounted on said partition and a cornered groove formed in said slide carriage and arranged for engagement with said control member to thereby arrest said partition after said partition has been pivoted into said position in the path of projecting light.

7. The projector of claim 6, wherein said shifting means include a thrust member pivotally mounted on said carriage, a first projection mounted at one end of said thrust member, a second projection mounted at another end of said thrust member, and a drive gear associated with the magazine, said thrust member is adapted to interact with said drive gear when the magazine is in alignment with said platform, said first projection and said second projection overlapping said ends of said thrust member thereby preventing said thrust member from falling out off said carriage during the pivoting movement of said thrust member.

8. The projector of claim 7, wherein said shifting means further include a pinned gear connected to said drive gear, said pinned gear having circumferentially spaced pins, said thrust member during the pivoting movement thereof being engaged between two successive pins of said pinned gear to thereby effect a rotation of said drive gear for shifting the magazine within the housing.

* * * * *